US008680434B2

(12) United States Patent
Stöger et al.

(10) Patent No.: US 8,680,434 B2
(45) Date of Patent: Mar. 25, 2014

(54) WELDING METHOD AND WELDING SYSTEM WITH DETERMINATION OF THE POSITION OF THE WELDING TORCH

(75) Inventors: Markus Stöger, Vorchdorf (AT); Manfred Wittmann, Rutzenmoos (AT); Tomas Leko, Wels (AT)

(73) Assignee: FRONIUS International GmbH, Pettenbach (AT)

( * ) Notice: Subject to any disclaimer, the term of this patent is extended or adjusted under 35 U.S.C. 154(b) by 701 days.

(21) Appl. No.: 11/922,959

(22) PCT Filed: May 17, 2006

(86) PCT No.: PCT/AT2006/000204
§ 371 (c)(1),
(2), (4) Date: Dec. 27, 2007

(87) PCT Pub. No.: WO2007/009131
PCT Pub. Date: Jan. 25, 2007

(65) Prior Publication Data
US 2008/0314887 A1 Dec. 25, 2008

(30) Foreign Application Priority Data
Jul. 15, 2005 (AT) ................................ A 1197/2005

(51) Int. Cl.
*B23K 9/10* (2006.01)
(52) U.S. Cl.
USPC ....................................... 219/137.7; 219/136

(58) Field of Classification Search
USPC ............ 219/121.48, 137.31, 136, 137.7, 132; 901/42
See application file for complete search history.

(56) References Cited

U.S. PATENT DOCUMENTS 4,389,561 A * 6/1983 Weman et al. ........... 219/124.34
(Continued)

FOREIGN PATENT DOCUMENTS

EP 1 495 827 A2 1/2005
JP 58038672 3/1983
(Continued)

OTHER PUBLICATIONS

International Search Report.

*Primary Examiner* — Henry Yuen
*Assistant Examiner* — Ayub Maye
(74) *Attorney, Agent, or Firm* — Collard & Roe, P.C.

(57) ABSTRACT

The invention relates to a welding method and a welding system that use a welding torch, the position of which is determined. In order to develop such a welding method and system, with which it is possible to reliably determine the position of the welding torch in three dimensions, it is provided that a signal is emitted by a transmitter, the signal being received by at least one sensor which is integrated in or is associated with the welding torch, the received data readings being sent to an evaluation unit, which determines values relating to the position of the welding torch in three dimensions.

31 Claims, 8 Drawing Sheets

(56) References Cited

U.S. PATENT DOCUMENTS

| | | | | |
|---|---|---|---|---|
| 4,590,577 | A | * | 5/1986 | Nio et al. ................. 700/252 |
| 5,053,976 | A | * | 10/1991 | Nose et al. ............... 700/251 |
| 6,067,129 | A | * | 5/2000 | Fergason .................... 349/14 |
| 6,479,793 | B1 | * | 11/2002 | Wittmann et al. ......... 219/130.5 |
| 6,566,636 | B1 | * | 5/2003 | Bentley et al. ............ 219/665 |
| 6,758,423 | B1 | * | 7/2004 | Perkins et al. ............ 239/690 |
| 6,791,062 | B1 | * | 9/2004 | Brunner et al. .......... 219/124.34 |
| 7,227,099 | B2 | * | 6/2007 | Blot et al. ............... 219/130.01 |
| 7,233,837 | B2 | * | 6/2007 | Swain et al. .............. 700/186 |
| 2005/0055127 | A1 | | 3/2005 | Swain et al. |
| 2005/0252897 | A1 | | 11/2005 | Hsu et al. |

FOREIGN PATENT DOCUMENTS

| | | |
|---|---|---|
| JP | 59 030478 A | 6/1984 |
| JP | 63286376 | 11/1988 |
| JP | 11320093 | 11/1999 |
| JP | 2000024777 | 1/2000 |
| JP | 2002120066 | 4/2002 |
| JP | 2003001420 | 1/2003 |

* cited by examiner

WELDING METHOD AND WELDING SYSTEM WITH DETERMINATION OF THE POSITION OF THE WELDING TORCH

CROSS REFERENCE TO RELATED APPLICATIONS

Applicants claim priority under 35 U.S.C. §119 of Austrian Application No. A 1197/2005 filed Jul. 15, 2005. Applicants also claim priority under 35 U.S.C. §365 of PCT/AT2006/000204 filed May 17, 2006. The international application under PCT article 21(2) was not published in English.

The invention relates to a welding method using a welding torch whose position is determined.

The invention further relates to a welding system including a welding apparatus and a welding torch capable of being connected via a hose pack, wherein a device for determining the position of the welding torch is provided.

Known position detection systems for welding torches are based on optical or magnetic systems, whereby a joint or weld can be recognized or the course of welding can be monitored along the joint. There, the transmitter and receiver units of the position detection system are either externally attached to the welding torch, e.g. the gas nozzle, or form an independent device or component. It is, thus, for instance, feasible to recognize a fillet weld or a butt weld with the position detection system being pulled along the joint to reach a weld. Such position detection systems are, for instance, known from patents JP 63 286376 AA and JP 58 038672 AA.

Such systems involve the drawback that they do not enable the determination of a position in space, i.e. the position of the manual welding torch in the three-dimensional space, but only allow the tracking of a joint.

The object of the invention resides in providing a welding method and system for a welding torch, in particular a manual welding torch, which enable the detection of the position of the welding torch in the three-dimensional space.

In method terms, the object of the invention is achieved in that a signal is emitted by a transmitter, which is received by at least one sensor integrated in, or associated with, the welding torch, and that the received measurement data are sent to an evaluation unit and the evaluation unit determines values for the position of the welding torch in the three-dimensional space. In doing so, it is advantageous that the values of the 3D positions of the welding torch determined during the position detection and the weld resulting therefrom can be used for subsequent applications or workpieces of the same kind. It is, thus, feasible in a simple manner to provide quality monitoring, weld reproducibility and welding parameter assignment in a welding torch system and, in particular, a manual welding torch system.

The received measurement data and/or determined values for the 3D position of the welding torch are advantageously stored.

The values for the 3D position of the welding torch are preferably determined at any settable time, in particular at the beginning and at the end of a welding process performed with the welding torch.

By the measure that, in addition to the 3D position values, the associated welding parameters are stored for the welding process performed with the welding torch, it will be ensured, when welding workpieces of the same kind on which different welds with preferably different welding parameters are to be realized, that the welding parameters will automatically be adjusted and changed as a function of the position during welding, thus accelerating series production and excluding false adjustments by the welder.

It will be advantageous if, in addition to the 3D position values, the associated times of a welding process performed with the welding torch are stored. This will ensure quality monitoring and the determination of, for instance, the welding speed as well as the documentation of the time of welding.

In an advantageous manner, the measure that the determined 3D position values, optionally along with the associated welding parameters and times, are used as reference values for subsequent welding processes of the same kind ensures that an approximately identical welding result will be achieved for similar welds of different workpieces of the same kind irrespectively of the welder.

It is also advantageous if the values determined for the 3D positions and times are compared with deposited reference values and, if required, the welding parameters are corrected and the effected changes are stored. This will also ensure a consistent quality of the weld.

By the measure that data relevant to the welding quality, in particular the welding speed, the sequence of the welds and the work angle of the welding torch, are detected during the welding process and preferably stored in the control device, an automatic documentation and quality control will be provided. Retracement at a later time will, thus, be readily feasible.

According to a further characteristic feature of the invention, the values stored for the 3D positions of the welding torch of at least one performed welding process, optionally reference values and stored alterations, are read out by the welding apparatus, particularly via an external device, for analysis and, preferably, training purposes. Thus, more rapid and efficient training of new personnel will be enabled.

It is also advantageous if the welding parameters of a welding process are automatically adjusted on the basis of the determined 3D position values. It is, thus, feasible to produce several welds by different welding methods, in particular standard and pulse welding methods, within a welding process, wherein the necessary adjustments and changeovers on the welding apparatus are automatically effected on the basis of a given position of the welding torch during the welding process.

The values determined for the 3D position of the welding torch are preferably compared with reference values and acoustically or optically displayed to the operator of the welding torch. It is, thus, feasible, to preset and indicate to the operator of the welding apparatus, by the aid of warning signals or graphic representations, the correct posture of the welding torch for the respective welding process or during a particular welding process. Such a feedback will enable the welder to immediately respond to welding faults, e.g. a deterioration of the seam appearance, and to avoid or reduce the same.

From the detected 3D position values as a function of time, the welding speed can be determined and compared with welding speed default values and acoustically or optically indicated to the operator of the welding torch. Such feedback, thus, ensures that the welder will be able to immediately react to welding faults, for instance too small a penetration on account of an excessive welding speed. It will, furthermore, be advantageously feasible to determine the welding speed in a simple manner without any external means so as not to restrict the freedom of movement of the welding torch.

If the start of a welding process is only allowed on default 3D positions, welds on wrong locations will be avoided. It will, furthermore, be ensured that the definition of a predefined weld sequence to be subsequently performed by the welder for every workpiece will be enabled. It will, thus, also be safeguarded that every workpiece will be produced with the appropriate number of welds on the respective positions.

The measure of adapting the reference value for a 3D position of the welding torch of the start position of a weld to the preferred welding direction of the operator of the welding apparatus enables the welder to guide the welding torch with the preferred hand (left or right).

The 3D position of the welding torch is preferably determined with the welding apparatus deactivated and, in particular, with the welding process not yet started. This promotes the acquisition of reference values, since no interference effects from the welding process will be created. At the same time, the welder has a better sight of the workpiece, since he does not require a protection means for his eyes as would be necessary with the welding process already started, so that enhanced positioning of the welding torch will be feasible. The welder is also able to carry out a simulation before the welding process proper so as to adapt himself to the position of the welding torch.

It is also advantageous that, in addition to, or instead of, a sensor provided in the welding torch, at least one further sensor is integrated in the work gear, in particular a wristband or glove, and the measurement data are preferably sent to the evaluation unit, thus allowing a flexible arrangement of the sensor. Another advantage resides in that the sensors provided in the welding torch may fail, yet the arrangement of further sensors in the welding glove will still allow the determination of an approximate position of the welding torch so as to ensure a simple and cost-effective structure of the welding torch.

If the reference values relating, for instance, to the start position of the weld and the welding parameters are stored in a memory provided in the welding torch, the welding torch will be usable independently of the power source, thus enabling the use of the preferred welding torch by every welder.

The reference values can be stored along with identifiers, in particular numbers, to identify the reference values for workpieces of the same kind. The 3D positions of the welding torch for the welds of similar workpieces are preferably stored in the welding apparatus along with the respective welding parameters so as to avoid identical 3D positions of different workpieces as reference values in the memory. It will, thus, be feasible to unambiguously assign any 3D position stored as a reference value for workpieces of the same kind.

If the time during the welding process performed with the welding torch is detected, it will be feasible to determine the welding speed and to document the date at which the welding was performed.

By the measure of sending the 3D position values determined during a welding process and the associated times to the control device of the welding apparatus to calculate the welding speed of the welding process, feedback on the welding speed will be sent to the welder during the welding procedure via appropriate means.

According to a further characteristic feature of the invention, the distance between the transmitter and a reference point in the three-dimensional space is adjusted. The adjustment of the distance between the transmitter and a reference point, will, thus, allow for the exact calculation of the position of the welding torch in the three-dimensional space.

The above-mentioned welding method can be applied both for manual applications using manual welding torches and for automated applications using welding robots.

The object of the invention is, however, also achieved by an above-identified welding system, wherein, for the determination of the position of the welding torch in a three-dimensional space, at least one transmitter and at least one sensor are arranged in, or associated with, the welding torch, which sensor is connected with an evaluation unit to enable the determination of the 3D position of the welding torch via the measurement data acquired by the sensor.

The transmitter may be formed by a coil, a radio station, a radar station or movable transmitters like satellites, in particular according to the GPS system. It will be of advantage if no visual contact is required between the sensors and the transmitter to determine the 3D position of the welding torch. Moreover, any positioning of the transmitter is to be feasible. Another advantage resides in that the use of already known transmitters will ensure cost-effective welding torch structures.

By the measure that the transmitter of the position detection device comprises at least one coil for generating a magnetic field in the area of the welding process realized by the welding torch and at least one sensor for detecting the magnetic field generated by the coil is arranged in, or associated with, the welding torch, it will be ensured that the magnetic field generated by the coil will penetrate any obstacle, object or similar within the space and, hence, enable the safe determination of the position of the welding torch.

If the transmitter covers several welding process areas and, hence, several welding torches so as to enable the determination of the 3D positions of several welding torches via the sensors integrated in the welding torches, existing welding process areas can be arbitrarily expanded and provided.

In an advantageous manner, each welding process area is assigned its own reference point in the three-dimensional space.

If the position detection sensor is formed by a magnetoresistive sensor, a high magnetic field sensitivity at low noise will be reached.

If a device for filtering interfering magnetic fields generated, in particular, by the power source of the welding apparatus and an electric arc is provided, the safe and exact determination of the position of the welding torch will be feasible.

If a display device for the acoustic and/or optical display of the determined 3D position, or of deviations from reference positions, is provided to promote corrective measures to be implemented, important information can be forwarded to the welder.

The display device is preferably integrated in the welder's work gear and, in particular, the welding helmet. With several welding processes running in parallel in different welding process areas, it will thereby be ensured that the individual welders will be informed on corrective measures pertaining to their own welding processes without being disturbed or influenced by any corrective measures implemented in parallel.

By the measure that, in addition to, or instead of, the sensors provided in the welding torch, at least one sensor is provided in a welder's work gear and, in particular, a wristband or glove, the flexible arrangement of the sensor will be ensured. Another advantage is that the sensors provided in the welding torch may fail, yet the arrangement of further sensors in the welding glove will still allow the determination of an approximate position of the welding torch so as to ensure a simple and cost-effective structure of the welding torch.

Alternatively to the above-described arrangement, it is also possible, for the determination of the position of the welding torch, that at least one transmitter is integrated in, or associated with, the welding torch, and that at least one sensor is arranged in the three-dimensional space, which sensor is connected with an evaluation unit to enable the determination of the values of the 3D position of the welding torch via the measurement data acquired by the sensor.

The present invention will be explained in more detail by way of the attached schematic drawings. Therein:

To begin with, it is noted that identical parts of the exemplary embodiment bear the same reference numerals.

FIG. 1 depicts a welding apparatus 1, or welding installation, for the most diverse processes or methods such as, e.g., MIG/MAG welding or WIG/TIG welding, or electrode welding methods, double-wire/tandem welding methods, plasma or soldering methods etc.

Figure 1:
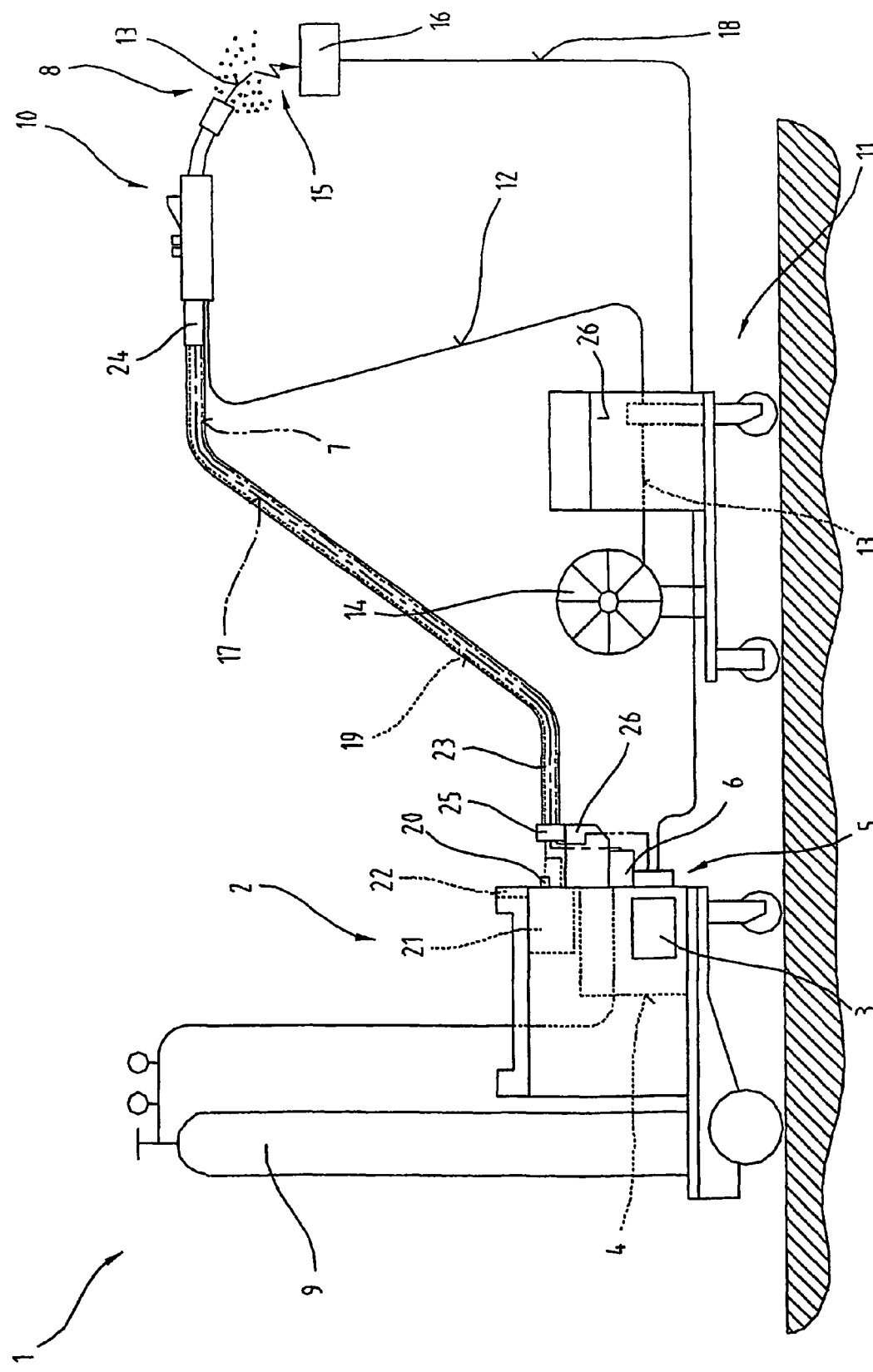
FIG. 1 is an exemplary representation of a welding apparatus.
Figure 2:
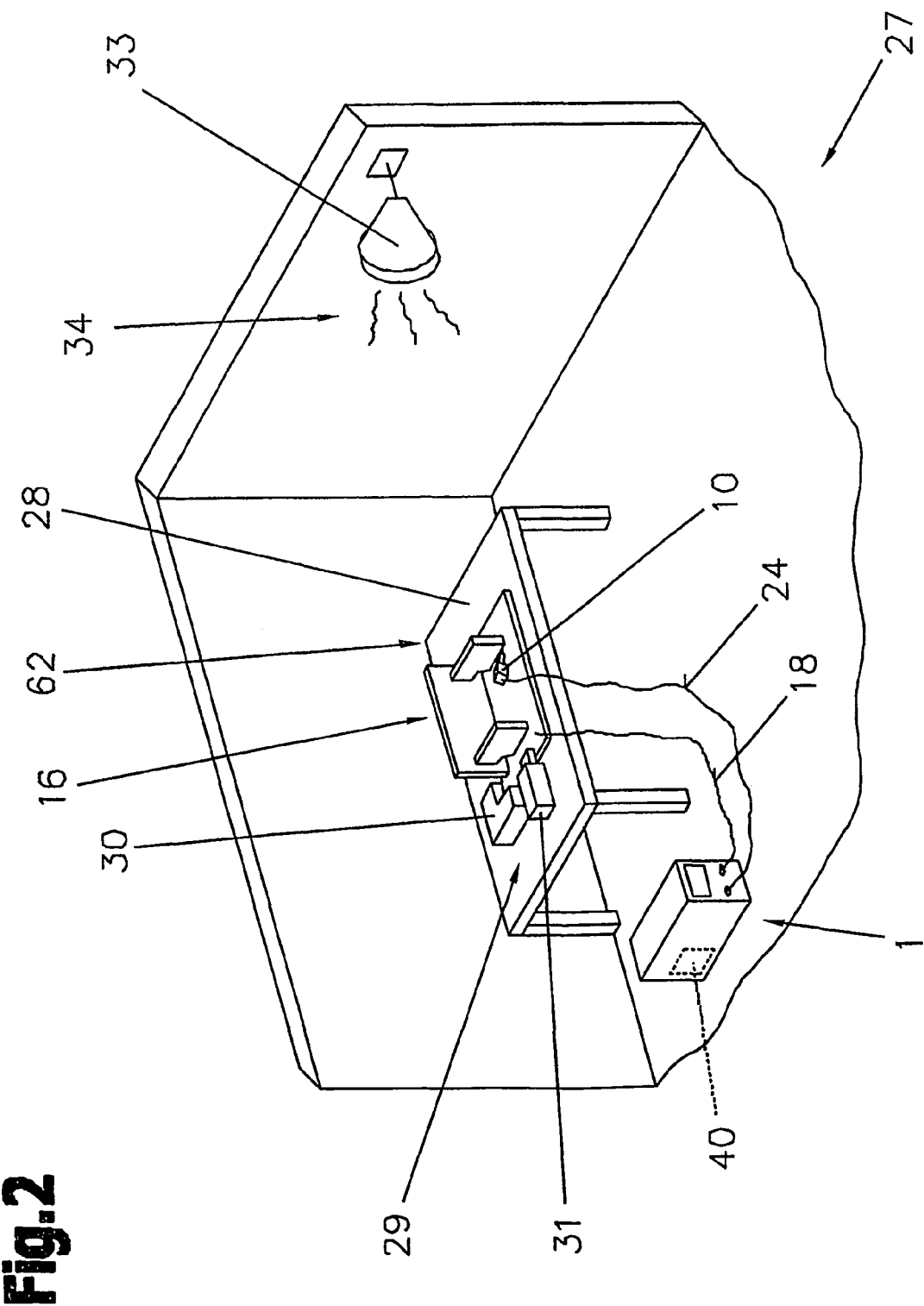
FIG. 2 illustrates the position detection according to the invention, of a manual welding torch in a welding process area within a room with a transmitter provided in said room.

The welding apparatus 1 comprises a power source 2 including a power element 3, a control device 4, and a switch member 5 associated with the power element 3 and control device 4, respectively. The switch member 5 and the control device 4 are connected to a control valve 6 arranged in a feed line 7 for a gas 8, in particular a protective gas such as, for instance, carbon dioxide, helium or argon and the like, between a gas reservoir 9 and a welding torch 10 or torch.

In addition, a wire feeder 11, which is usually employed in MIG/MAG welding, can be controlled by the control device 4, whereby a filler material or welding wire 13 is fed from a feed drum 14 or wire coil into the region of the welding torch 10 via a feed line 12. It is, of course, possible to integrate the wire feeder 11 in the welding apparatus 1 and, in particular, its basic housing, as is known from the prior art, rather than designing the same as an accessory device as illustrated in FIG. 1.

It is also feasible for the wire feeder 11 to supply the welding wire 13, or filler metal, to the process site outside the welding torch 10, to which end a non-consumable electrode is preferably arranged within the welding torch 10, as is usually the case with WIG/TIG welding.

The power required to build up an electric arc 15, in particular an operative electric arc, between the non-consumable electrode (not illustrated) and a workpiece 16 is supplied from the power element 3 of the power source 2 to the welding torch 10, in particular electrode, via a welding line 17, wherein the workpiece 16 to be welded, which is preferably formed by several parts, via a further welding line 18 is likewise connected with the welding apparatus 1 and, in particular, power source 2 so as to enable a power circuit for a process to build up over the electric arc 15, or a plasma jet formed.

To provide cooling of the welding torch 10, the welding torch 10 can be connected to a fluid reservoir, in particular a water reservoir 21, by a cooling circuit 19 via an interposed flow control 20 so as to cause the cooling circuit 19, in particular a fluid pump used for the fluid contained in the water reservoir 21, to be started as the welding torch 10 is put into operation, in order to effect cooling of the welding torch 10 by feeding a cooling medium.

The welding apparatus 1 further comprises an input and/or output device 22, via which the most different welding parameters, operating modes or welding programs of the welding apparatus 1 can be set and called, respectively. In doing so, the welding parameters, operating modes or welding programs set via the input and/or output device 22 are transmitted to the control device 4, which subsequently controls the individual components of the welding system or welding apparatus 1 and/or predetermines the respective reference values for controlling.

In the exemplary embodiment illustrated, the welding torch 10 is, furthermore, connected with the welding apparatus 1 or welding system via a hose pack 23. The hose pack 23 houses the individual lines from the welding apparatus 1 to the welding torch 10. The hose pack 23 is connected with the welding torch 10 via a coupling mechanism 24, whereas the individual lines arranged in the hose pack 23 are connected with the individual contacts of the welding apparatus 1 via connection sockets or plug-in connections. In order to ensure an appropriate strain relief of the hose pack 23, the hose pack 23 is connected with a housing 26, in particular the basic housing of the welding apparatus 1, via a strain relief means 25. It is, of course, also possible to use the coupling mechanism 24 for connection to the welding apparatus 1.

It should basically be noted that not all of the previously mentioned components have to be used or employed for the various welding methods or welding apparatus 1 such as, e.g., WIG devices or MIG/MAG apparatus or plasma devices. Thus, it is, for instance, possible to devise the welding torch 10 as an air-cooled welding torch 10.

With reference to FIGS. 2 to 5, the position detection according to the invention will be explained by way of a manual welding process performed in a welding process area 27 located in a room, for instance a workstation in a hall. The illustrated welding process area 27, for one part, is comprised of a workbench 28 including a clamping device 29 for the workpiece 16. The clamping device 29 is, for instance, comprised of at least one work angle 30 and at least one fixing device 31 in order that a defined starting point will always be provided for the production of a weld. Since the workpiece 16 may be formed by several individual parts, as is more clearly apparent from FIG. 5, the clamping device 29 also provides fixing means for the individual parts of the workpiece 16, which are, however, not illustrated for the sake of simplicity. For the other part, the welding process area 27 for the realization of a welding process is equipped with the welding apparatus 1, which is connected with the welding torch 10, or a manual welding torch, via the hose pack 23. The workpiece 16, or workbench 28, is connected with a further welding line 18. Depending on the welding method employed, a wire feed 11 may either be provided or not. A welding process can, thus, be started in order to produce or weld the workpiece 16.

For the production of the workpiece 16 comprised of several individual parts, the welding process area 27 may also offer a seat (not illustrated) for a welder. The welding of two parts by the welding torch 10 produces one or several welds 32 to permanently join the welded parts. To this end, the welder will set for the welding process the respective welding parameters such as welding current, welding voltage, wire feeding speed etc. with a view to obtaining the optimum weld quality. During a welding process, the control device 4 will control the welding parameters to keep them approximately constant.

In accordance with the invention, a position detection system is activated at the start of a welding process to determine values of the position of the welding torch 10 in the three-dimensional space. To this end, a transmitter 33 is arranged in the welding process area 27 to emit a signal 34, which will be received by a receiver 35 and a sensor 36, respectively, integrated in, or associated with, the welding torch 10.

To determine the position in the three-dimensional space, it is necessary to define three coordinates from the signal 34 delivered by the transmitter 33, preferably the values X, Y and Z known from the Cartesian coordinate system. The receiver 35 integrated in the welding torch 10 as in accordance with FIG. 3, therefore, comprises three sensors 36-38, each sensor 36-38 being able to determine one of the three values X, Y or Z.

Since the signal 34 may be influenced by other systems installed in the welding process area 27 or by interferences produced by the welding process, thus falsifying the values determined by the sensors 36-38, the sensors 36-38 are associated with a filter device 39. This allows the values for the 3D position of the welding torch 10 determined by the sensors 36-38 to be sent as measurement data to an evaluation unit 40. The evaluation unit 40 is, for instance, arranged in the welding apparatus 1 or constitutes a separate, external unit. The transmission of the measurement data of the sensors 36-38 is, for instance, effected via a data communication unit 42 integrated in the receiver 35 or sensor 36, which data communication unit is connected with the evaluation unit 40 provided in the welding apparatus 1, for instance, via a data bus 42 integrated in the hose pack 23.

With such a construction, the welding torch 10 has a certain moving radius on which the three-dimensional position will remain unchanged. If, for instance, the sensors 36-38 are, in fact, arranged in the front portion, i.e. on that end where the welding wire 13 emerges from the welding torch 10, the rear portion of the welding torch 10 will be freely movable with the 3D position remaining unchanged. As a result, the posture of the welding torch 10 will not be taken into account.

Since, however, the posture of the welding torch 10 does have some influence on the quality of the weld 32 in some welding methods, the sensors 36-38 are differently distributed within the welding torch 10.

Figure 4:
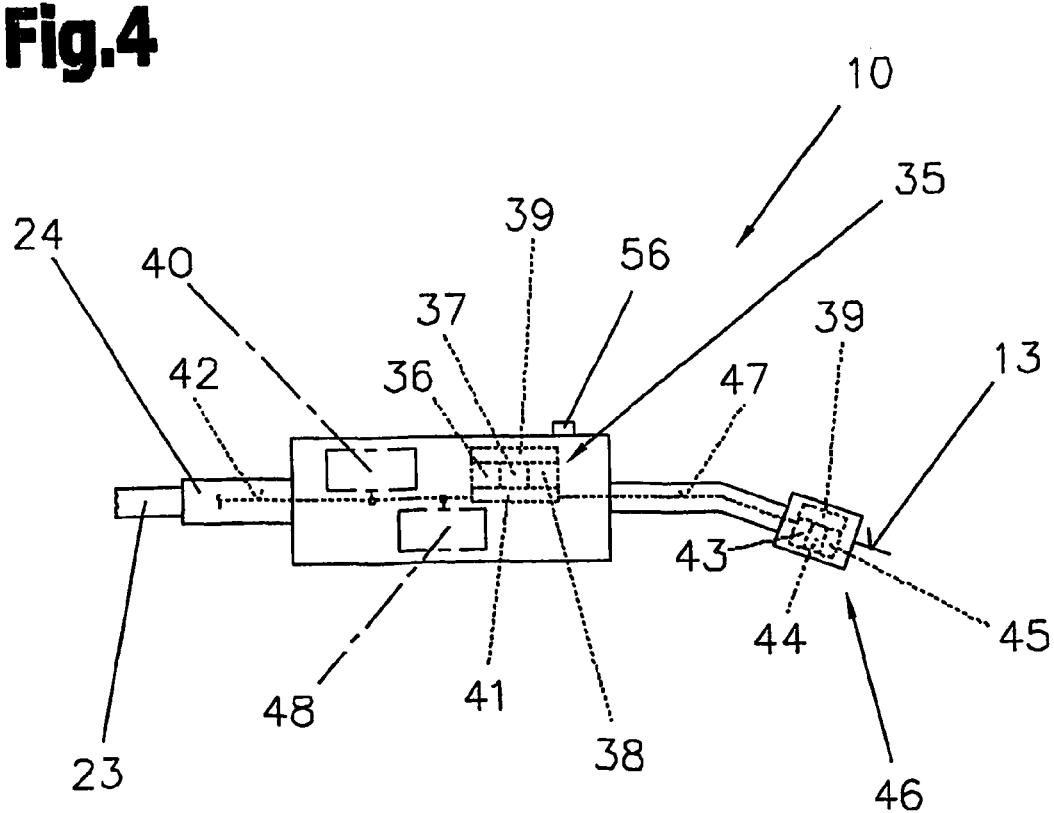
FIG. 4 is a schematic illustration of a manual welding torch with an integrated sensor and additional sensors.

As is apparent from FIG. 4, further sensors 43-45 may be integrated in the gas nozzle 46 of the welding torch 10 further to the three sensors 36-38 integrated in the welding torch 10. The filter unit 39 is also associated with the sensors 43-45, the sensors 43-45 via an internal data bus 47 being connected with the data communication unit 41 provided in the welding torch 10. The evaluation unit 40 will, thus, receive measurement data from two different positions within the welding torch 10 so as to enable the posture of the welding torch 10 to be taken into account during a welding procedure.

Figure 3:
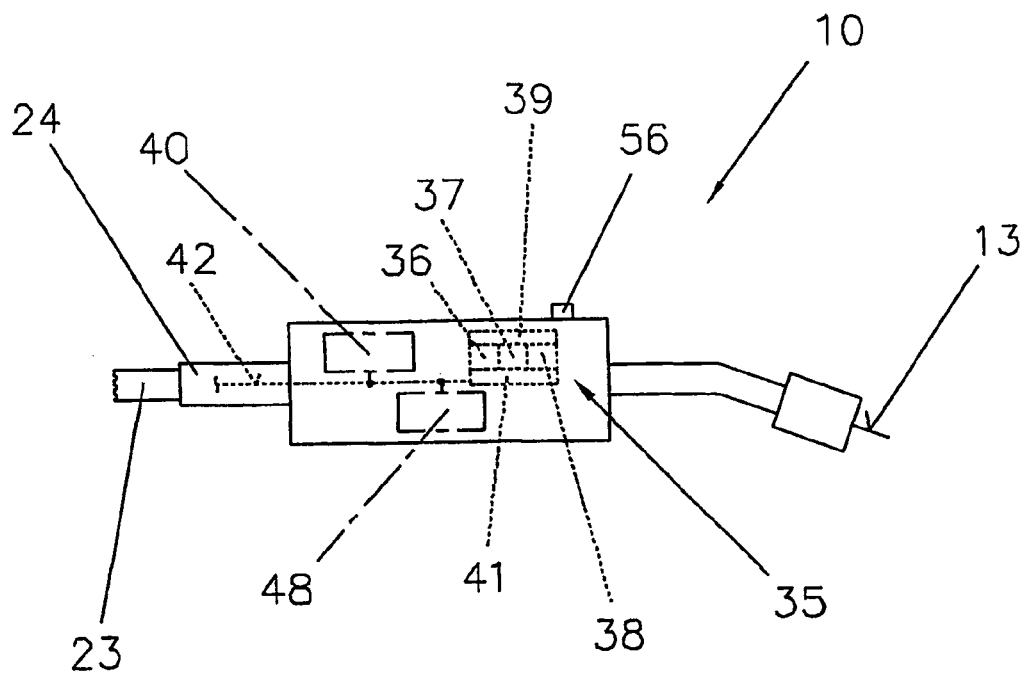
FIG. 3 is a schematic illustration of a manual welding torch with an integrated sensor.

In general, it should be noted in respect to FIGS. 3 and 4 that it is, of course, also possible for the data communication unit 41 to send the measurement data of the sensors 36-38 to the evaluation unit 40 via a radio link. From the sent measurement data, the evaluation unit 40 will be able to determine and store the respective 3D position. This is preferably done by the software using known calculation methods.

The evaluation unit 40 and/or a memory 48 may also be integrated in the welding torch 10. It may be used for storing in the welding torch 10 the data that are relevant to the position detection according to the invention, in particular the 3D positions, as well as associated welding parameters, which will be discussed in more detail below.

Figure 5:
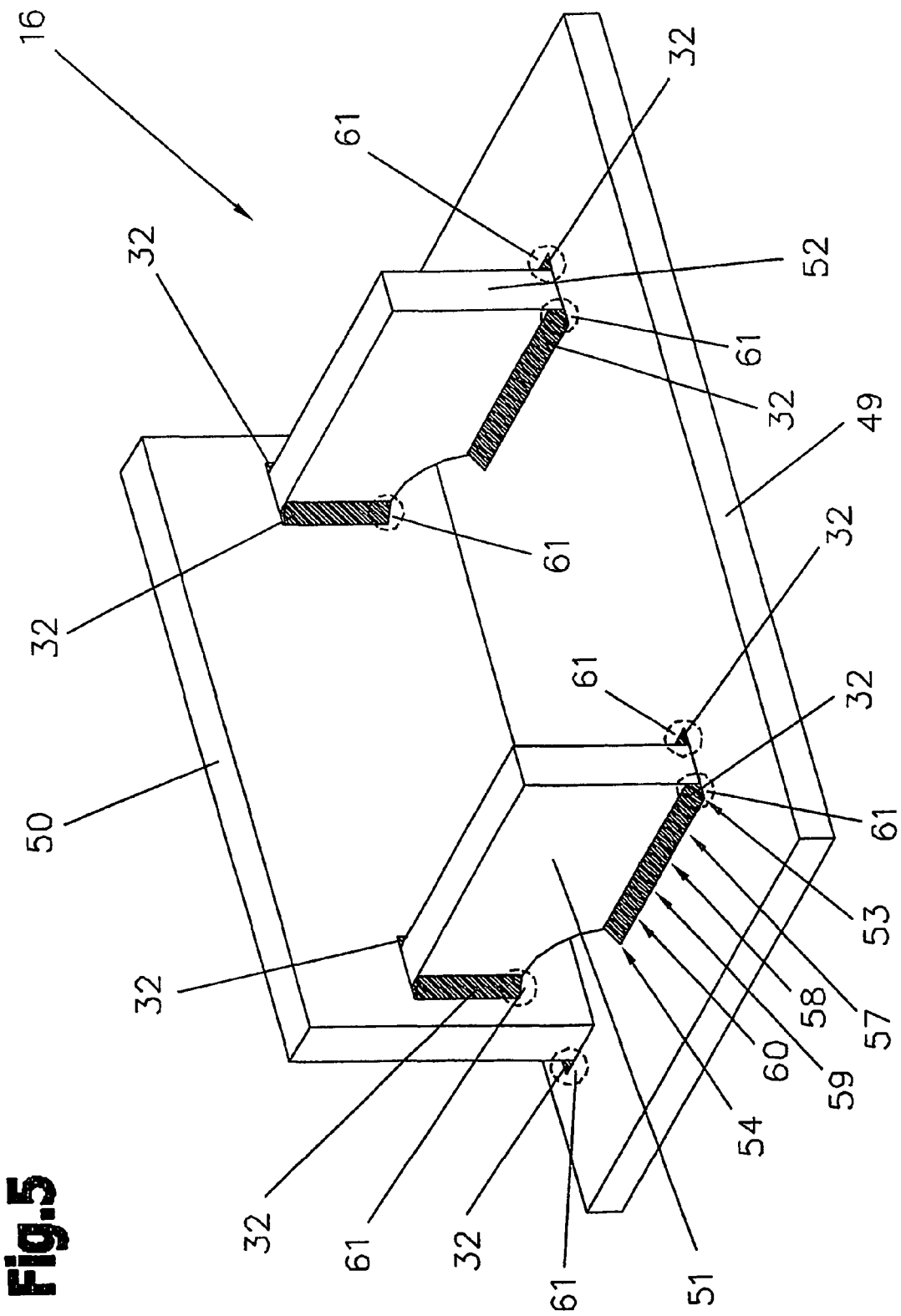
FIG. 5 is a schematic illustration of a workpiece comprised of several parts connected with one another via appropriate welds.

The position detection according to the invention can be performed, e.g. on the workpiece 16 illustrated in FIG. 5, by using the welding torch 10 described in FIG. 3 or 4.

The position detection of the welding torch 10 is, for instance, performed such that a signal 34 is emitted by the transmitter 33. Via sensors 36-38, 43-45, the receiver 35 will determine from said signal 34 the measurement data for the determination of the 3D position of the welding torch 10, which are transmitted to the evaluation unit 40. From the transmitted measurement data, the evaluation unit 40 will calculate and store the 3D position of the welding torch 10. This will, in particular, be advantageous if larger piece numbers of a workpiece 16 are produced, i.e. several identical workpieces 16 are welded. In this case, when making the first workpiece 16, a defined number of 3D positions of the welding torch 10 will be detected and stored during the welding process and taken as reference values for the other, identical workpieces 16.

Several welds 32 are necessary for joining the four parts of the workpiece 16, namely the base part 49, the rear part 50, the side part 51 and the side part 52. If the parts 49-52 to be welded are made of different materials or have different material thicknesses, different welding parameters will be required for the individual welds 32. Similarly, different welding methods may be required for different materials, or different welding methods may be employed for identical materials. Standard welding is, for instance, used for welding the side parts 51, 52 with the base part 49, and pulse welding is employed for welding the base part 49 with the rear part 50, from which accordingly different welding parameters will result for these welds 32.

The respective welding parameters are stored in addition to the values of the respective 3D positions of the welding torch 10. To the reference values for the 3D positions of the welding torch 10 are, thus, additionally deposited the associated welding parameters.

Different modes of procedure may be envisaged for storing 3D positions and reference values. To this end, the reference values of a weld 32 may be comprised of at least two 3D position values, namely a start position 53 and an end position 54. In a welding procedure only the start position 53 and the end position 54 will, hence, be detected and compared with the reference values, whereby only a few data will be required for the determination of a weld 32. It goes without saying that, between these two positions, further positions, for instance after a predefined time interval 55, may be acquired as reference values and stored along with the respective welding parameters.

In order to fix the reference values of the 3D positions of the welding torch 10, the welder will perform one or several test weldings of the respective seams 32. In doing so, a quality control will be carried out after each test weld. Based on the results of such quality control, the welder will be able to accordingly change the welding parameters adjusted at the welding apparatus 1 during the test welding. This procedure will be repeated by the welder until the optimum quality of the weld 32 will be achieved.

In order to subsequently store the reference values, i.e. the values of the 3D positions of the welding torch 10, the welder may at the beginning of the welding procedure define the current 3D position of the welding torch 10 as a start position 53 for the respective weld 32 by pressing a push-button 56 on the welding torch 10. This will cause the welding apparatus 1 to store the position with the associated welding parameters. It is, of course, also possible to store further data and/or initiate appropriate recording procedures. To this end, it is possible to start a timing process with the beginning of the welding procedure. During the welding process, the position of the welding torch 10 determined by the evaluation unit 40, the welding parameters and the time may likewise be stored, for instance, at defined times or after a preset time interval 55, which will result in several 3D positions 57, 58, 59 and 60 within a weld 32. When reaching the end of the weld 32 to be made, the welder may, for instance by newly pressing the push-button 56, define the end position 54 of the weld 32, whose position along with the associated welding parameters is stored, as is the timing for the welding procedure.

After the 3D positions of the welding torch 10 for the respective welds 32 of the workpiece 16 have been detected and stored by the evaluation device 40, said positions are used as reference values for the subsequent, identical workpieces 16 and their welds 32.

Before the adoption of the reference values, the welder may, of course, fix the data to be recorded on the welding apparatus 1 or via an external component such as a PC, and adjust the respective welding parameters, additional functions, times etc., which will then be automatically stored.

The acquisition of the reference values for the 3D position of a weld 32 may, of course, be effected with the welding apparatus 1 or welding process deactivated. This will ensure that the evaluation unit 40 will receive more exact measurement data from the sensors 36-38, since, in particular, no interferences caused by the electric arc 15 will occur and a more precise determination of said position will, thus, be feasible. In this respect, it will be advantageous if the acquisition of data takes place in several subsequent operating steps, i.e. that, in the beginning, the acquisition of the positions is realized without activated welding process, whereupon the same procedure is repeated with the welding process activated such that the actual welding parameters and additional functions can be recorded. It is, however, also possible for the welder to adjust and store the respective set values for the 3D position on the welding apparatus 1.

The acquisition of the reference values of a workpiece 16 is, thus, completed and they can be used for other workpieces 16 of the same kind.

As the welder starts the welding process for an identical, new workpiece 16 via the push-button 56 on the welding torch 10, the position detection system is started, thus causing a constant position determination of the welding torch 10 in the three-dimensional space to be carried out and the determined positions to be compared with reference values. As the welder takes the welding torch 10 to one of the start positions 53, the welding parameters and additional functions deposited in respect to the start position 53 are preferably automatically adjusted by the evaluation unit 40 and control device 4 of the welding apparatus 1. It is only after this, that the ignition of the electric arc 15 is activated and the welding procedure is carried out. During the welding process it will be advantageous, if a constant comparison of the current position of the welding torch 10 with the deposited reference values is being effected. It is, thus, for instance, feasible to inform the welder on whether the current welding speed and posture of the welding torch 10 are correct, based on the deposited reference values, as is described in more detail by way of FIGS. 8 and 9. When the evaluation unit 40 recognizes the end position 54 of the weld 32 on grounds of the measurement data supplied by the sensors 36-38, the welding process will, for instance, be automatically terminated.

This will facilitate and accelerate the welding process, since the welder configures the welding installation just once for a workpiece 16 by acquiring the reference values. Adaptation to various welding processes to be performed, or welds 32 to be produced, will then automatically occur for the subsequent workpieces 16 of the same kind. It is, thus, no longer necessary for the welder, in the event of different welding parameters or operating modes, to manually convert the welding apparatus 1 in view of the respective weld 32 to be produced, but this will happen fully automatically. Maladjustments will, thus, be prevented, and the production time for a workpiece 16 will be substantially reduced.

The start position 53 of the weld 32 may, of course, also comprise a tolerance limit or area 61 within which the start position 53 is recognized as such and an activation of the welding process is possible. This has the advantage that the welder need not take the welding torch 10 to exactly the predetermined position. On the welding torch 10 may, for instance, be provided a display element, e.g. a light diode, which will be activated when the welder reaches the area 61 of the start position 53 with the welding torch 10. Naturally, an acoustic signal may also be employed.

When all welds 32 of a workpiece 16 have been completed, the welder may produce another workpiece 16 of the same kind without changing the position of the clamping device 29 such that the stored reference points can also be used for the workpiece 16 to follow.

With the recognition of the position of the welding torch 10, a number of additional functions or additional applications may, moreover, be performed or realized, respectively.

It is, for instance, possible to monitor the number of welds 32 to be made per workpiece 16. On account of the deposited start positions 53 of the welds 32 of a workpiece 16 as reference values, the number of welds 32 per workpiece 16 is fixed. As the individual welds 32 are being worked off, the respectively approached start position 53 is detected by the control device 4 and evaluation unit 40. During the welding of an identical workpiece 16, it will, thus, be recognized if a weld 32 has not been welded, since said start position 53 was not targeted by the welder with the welding torch 10. A quality control, in particular as to whether all of the required welds 32 have actually been welded, will thus be feasible. It is only after the welding of all seams 32 of a workpiece 16 that all of the start positions 53 will be cleared again to enable the welder to process a new workpiece 16.

The quality control, for instance, also allows for the acquisition of the number of correctly finished workpieces 16. This can be determined through the number of welded seams 32 of identical workpieces 16. From this, the number of correctly finished workpieces 16 can then be gathered. To this end, the welding apparatus 1 or evaluation unit 40 is preferably connected to a network in a manner that the respective data can, for instance, be sent to a storage administration and, in particular, a storage administration program.

This system can likewise be used for training purposes, since the welds 32 can be simulated by guiding the welding torch 10 along the welds 32. The trainee may, in fact, practice the correct posture of the welding torch 10 without starting the welding process. In doing so, the trainee may also learn the observance of a preset welding speed while, at the same time, monitoring the guiding speed of the welding torch 10. Speed monitoring is, in fact, simple to realize with this system, since only the time between two positions need be acquired in order to subsequently determine the speed therefrom.

Basically, the comparison of stored 3D positions of the welding torch 10, i.e. the reference values, with the actual 3D positions of the welding torch 10 during a welding process will offer a plurality of method sequence options, which are either fixedly deposited in the welding apparatus 1 or evaluation unit 40, or can be selected by the user. The adaptation of particular sequences for the welding of a workpiece 16 will, thus, be feasible.

To this end, it is, for instance, possible to adjust the welding apparatus 1 such that a defined sequence of the seams 32 to be welded need not obligatorily be executed on the workpiece 16. Consequently, a welder may, for instance, start welding the base part 49 with the side part 51, a second welder may do so with the base part 49 and the rear part 50, and a third welder may do so with the base part 49 and the side part 52, which means that a so-called assembly production is feasible using one and the same welding apparatus 1 or several consecutively arranged welding apparatus 1. In this case, no sequence will be stored during the acquisition of the start positions 53 of the welds 32 so as to allow the sequence to be arbitrarily selected when welding by the aid of said reference values.

It may, of course, happen that a particular sequence of welds 32 will have to be followed when welding certain workpieces 16 (not illustrated). In that case, a suitable additional function, e.g. a number, will be deposited along with the 3D position of the welding torch 10 when detecting the individual start positions 53 of a weld 32, so as to force the welder to follow a respective sequence. It will, thus, be impossible to start welding at a start position 53 with a deposited sequence number, e.g. 4, if the preceding weld having, for instance, the number 3 stored with the start position 53 has not yet been executed.

The welding direction of the welder, i.e. whether the welder guides the welding torch 10 by his left or his right hand, determines the start position 53 of a weld 32. If the welding direction extends opposite to the direction defined by the reference values, the evaluation unit 40 will calculate a new start position 53 based on the current position of the welding torch 10. This means that the reference value originally defined as the end position 54 will serve as the start position 53. Moreover, the reference value for the posture of the manual welding torch 10 will likewise be adapted to the welding direction of the welder. The end position 54 may, thus, also serve as a start position 53. This is accordingly deposited, since a welding process can only be started at a position defined either as the start position 53 or as the end position 54.

If a welding process is inadvertently interrupted, the control device 4 will recognize this, and the respective position will, for instance, be temporarily stored as the start position 53. This enables the welder to complete the interrupted weld 32 as far as to the end position 54.

Due to the continuous evaluation of the measurement data supplied by the sensors 36-38, the evaluation unit 40 will recognize when the welder is in the start position 53 of a weld 32 with the welding torch 10, i.e. a workpiece 16 of the same kind is produced with the deposited reference values. To this end, it is necessary that workpieces 16 of the same kind be fixed to the workbench 28 in the same position.

Similarly, it is possible for every weld 32 to be welded on the workpiece 16 to store an additional function, for instance a number, in the memory 48 integrated in the welding torch 10. In doing so, the 3D positions, the welding parameters etc. are, for instance, deposited in the control device 4 in one or several welding apparatus 1. In order to enable the appropriate adjustment of the welding parameters for the welds 32 of different welding apparatus 1, based on the position of the welding torch 10, the value for the respective weld 32 is transmitted to the control device 4 of the connected welding apparatus 1 via the data bus 42 or the radio link to adjust the welding parameters accordingly. This makes the welding torch 10 independent of the power source 2 and the welding apparatus 1 and enables the welder to connect the welding torch 10 to any suitable welding apparatus 1.

After having finished a workpiece 16, the welder can, of course, produce a new workpiece 16. For the new workpiece 16, the reference values have, for instance, already been acquired. For the new workpiece 16, the clamping device 29 is to be appropriately positioned on the workbench 28, with the position of the clamping device 29 on the workbench 28 being arbitrarily selectable. It is, thus, feasible to produce workpieces 16 of different dimensions.

It is thereby possible to acquire and store reference values for different workpieces 16. In order to avoid a double reference value, i.e. prevent two different workpieces 16 from having the same reference value, an identifier may be assigned to the different workpieces 16. Any stored reference value will, thus, be unambiguously defined.

This means, for instance, that after the identifier or number "1" a workpiece 16 having the respective reference values is deposited, after number "2" a second workpiece 16 having the respective reference values is deposited and so on. In practice, this means that the welder, in order be able to weld the workpiece 16 corresponding to number "1", will, for instance, set the respective number "1" by a setting element provided on the welding torch 10 or on the welding apparatus 1. After this, the respective reference values deposited after number "1" will be used, with the respective welding parameters being adjusted accordingly. In this case, it is possible to store both the number and reference values either in the memory 48 in the welding torch 10 or in welding apparatus 1, or only the number for the workpiece 16 in the welding torch 10 and the reference values in the welding apparatus 1. If the welder replaces the workpiece 16, he will have to set the respective number on the welding torch 10 and position the clamping device 29 on the workbench 28 accordingly.

The position of the clamping device 29 for the respective workpiece 16 may also be stored. This will enable in a simple manner the correct positioning of the clamping device 29 when producing an identical workpiece 16, for instance via a display provided on the clamping device 29. The workpiece 16 may, moreover, be turned so as to facilitate handling by the welder. In doing so, the reference values will be accordingly adapted to the position of the clamping device 29. This may, for instance, be realized in that a starting point is fixed on the clamping device 29 such that the welder will subsequently position the welding torch 10 on the starting point and effect an adjustment, for instance by actuating a push-button, so as to cause the reference values relating to the starting point to be calculated anew.

Furthermore, the workpiece 16 to be produced can be automatically recognized on grounds of the position of the clamping device 29 and/or the stored reference values. To this end, the respective welding parameters for the welds 32 of the workpiece 16 are adjusted for the welding procedure. Similarly, the sequence of the welds 32 is, for instance, taken into account. If, however, a reference value of the workpiece 16 to be produced coincides with a reference value of another workpiece 16, the welder will be alerted by suitable measures that the workpiece 16 will have to be defined by inputting the respective identifier or number.

It is, however, also possible to adapt the reference values for a workpiece 16 to the position of the clamping device 29. The workpiece 16 can, thus, be fixed to the workbench 28 on a site preferred by the welder, whereupon an adjustment of the reference values to the new position of the workpiece 16 on the workbench 28 will be performed.

According to an exemplary embodiment of the welding torch 10, the transmitter 33 is designed as a coil, which coil is mounted in a fixed position within the welding process area 27. The coil in the current-carrying state produces a magnetic field which serves as a signal 34. In order that the sensors 36-38 and 43-45, respectively, of the receiver 36 in the welding torch 10 are able to measure the magnetic field of the transmitter 33, they are configured as magnetoresistive sensors 36-38 and 43-45, respectively. The magnetic field of the coil will change the electric conductivity of the sensor 36-38 and 43-45, thus causing the same to change their resistance values, which serve as measurement data for the determination of the three-dimensional position of the welding torch 10.

In order to enable the evaluation unit 40 to calculate a 3D position from the changes in the resistance values of the sensors 36-38 and 43-45, respectively, a reference point 62 is preferably deposited in the evaluation unit 40. It will indicate the resistance values of the sensors 36-38 and 43-45, respectively, at a predefined position in the welding process area 27, for instance, in a corner of the fixedly mounted workbench 34. An adjustment of the position detection system will, thus, be effected. It is likewise possible to attach magnetoresistive sensors to the reference point 62. In that case, the evaluation unit 40 will be able to determine from the reference point 62 the position of the welding torch 10 in respect to the measurement data of the sensors 36-38 and 43-45, respectively. This will ensure free movability of the workbench 28.

Furthermore, the magnetic field produced as said signal 34 by the transmitter 33 or coil is superimposed by other interfering magnetic fields, for instance the magnetic field produced by the welding apparatus 1 and, in particular, the magnetic field produced by the electric arc 15, whereby the measurement data of the sensors 36-38 and 43-45, respectively, will be influenced. Consequently, a filter device 39 is, for instance, integrated in the receiver 35 or in the evaluation unit 40 to filter, in particular, the known interfering magnetic fields. This may, for instance, be effected by a discrete Fourier transformation (DFT). The evaluation unit 40 will, thus, receive filtered, correct measurement data so as to be able to exactly determine the position of the welding torch 10 in the three-dimensional space by way of the same and the reference point 62. It is, thus, feasible to detect and store the positions of the welding torch 10 with the respective welding parameters for a weld 32 of a workpiece 16, such as the start position 53 and the end position 54. The stored values will be used as reference values for the production of a workpieces 16 of the same kind, the welding parameters deposited with the respective reference values being preferably automatically adjusted by the control device 4.

Figure 6:
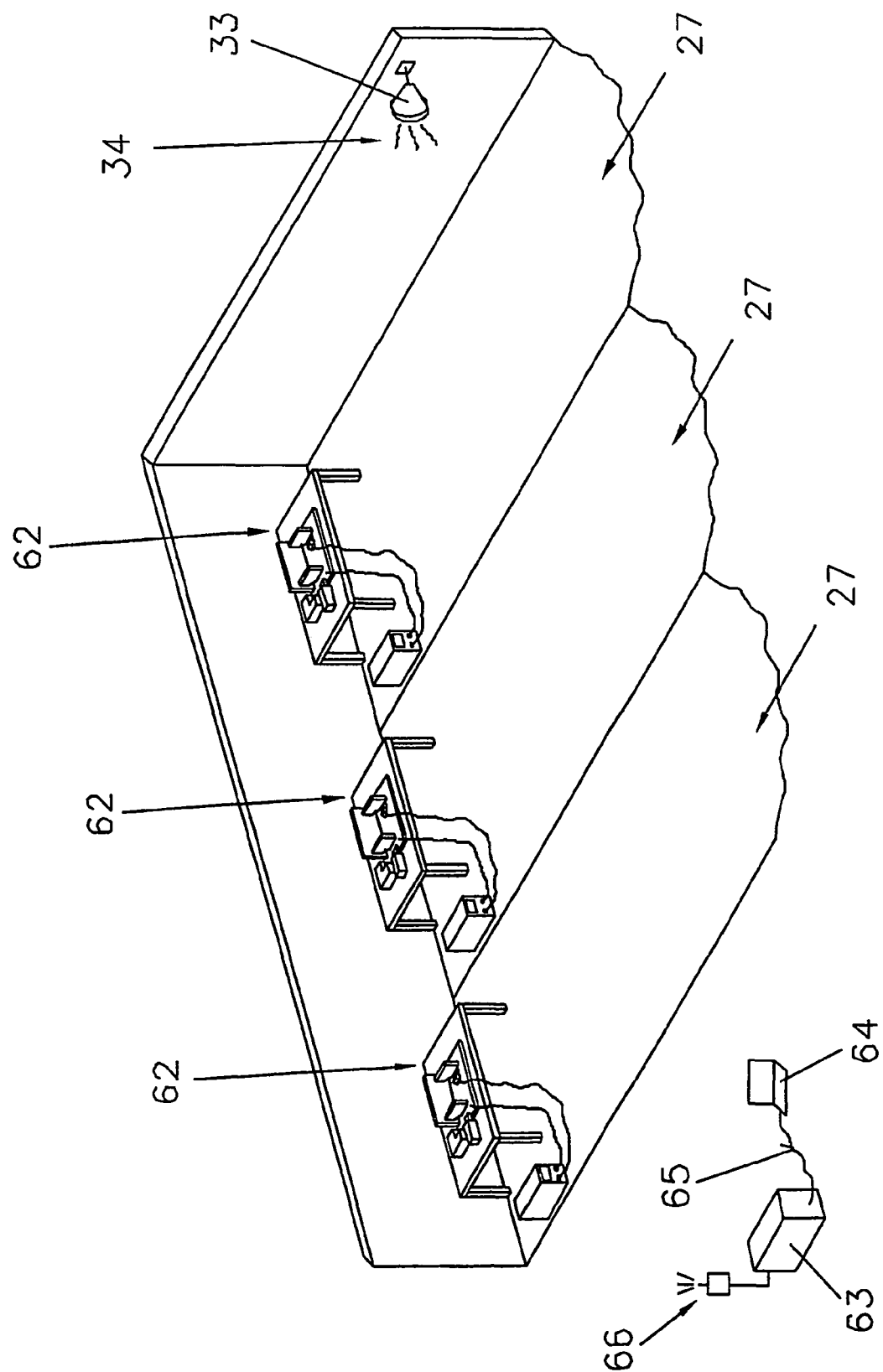
FIG. 6 illustrates the position detection according to the invention, of several welding torches in several welding process areas within one room with a transmitter provided in said room.

FIG. 6 depicts an exemplary embodiment in which the transmitter 33 supplies several welding process areas 27 with the signal 34. In this case, the signal 34, because of the increased range, must be amplified by an accordingly higher factor than would be required when supplying just a single welding process area 27 by the fixedly mounted transmitter 33. If a coil is used as said transmitter 33 to produce a magnetic field as said signal 34, the known interfering magnetic fields of the neighboring welding process areas 27 may, thus, have to be additionally taken into account by the filter device 39 when filtering the known interfering magnetic fields. Furthermore, each welding process area 27 will, for instance, have its own reference point 62 such that the evaluation unit 40 will determine the associated 3D position of the welding torch 10. On the other hand, the individual welding process areas 27 may have a common reference point 62 (not illustrated), which is deposited in the evaluation units 40.

The transmitter 33 may, for instance, also be comprised of a radio station, a radar station or a local position detection system (LPS). In those cases, appropriate sensors 36-38 and 43-45 will have to be used, and the filter device 39 will have to be accordingly adapted to the interference sources. Such systems are preferably used with several welding process areas 27 or for larger distances between transmitters 33 and receivers 35.

The data communication unit 41 of the receiver 35 may, of course, transmit the measurement data of the sensors 36-38 and 43-45, respectively, of a welding process area 27 to an external evaluation unit 63 to determine the position of the welding torch 10. Here again, the detected 3D positions of the welding torch 10 may be stored as reference values.

Furthermore, an interface for external devices may be integrated in the evaluation unit 40 or external evaluation unit 63 to enable the exchange of data. In this case, the stored data for evaluation can, for instance, be read out by a computer 64, which may be connected with the external evaluation unit 63 by a cable 65. The computer 64 may likewise be connected with the external evaluation unit 63 via a radio link (not illustrated). If a 3D position of the welding torch 10 is recognized as a reference value, for instance a start position 53 of a weld 32, the associated welding parameters deposited will be transmitted to the welding apparatus 1 by the external evaluation unit 63. This is, for instance, effected via a radio unit 66, with the welding apparatus 1 receiving the transmitted data and, in particular, welding parameters.

The external evaluation unit 63 may also be responsible for any welding process area 27 located within the room. In this respect, it is advantageous that the stored data of the external evaluation unit 63 can be read out, or reference values for the welds 32 of workpieces 16 can preferably be imported, centrally, e.g. via the computer 64.

Figure 7:
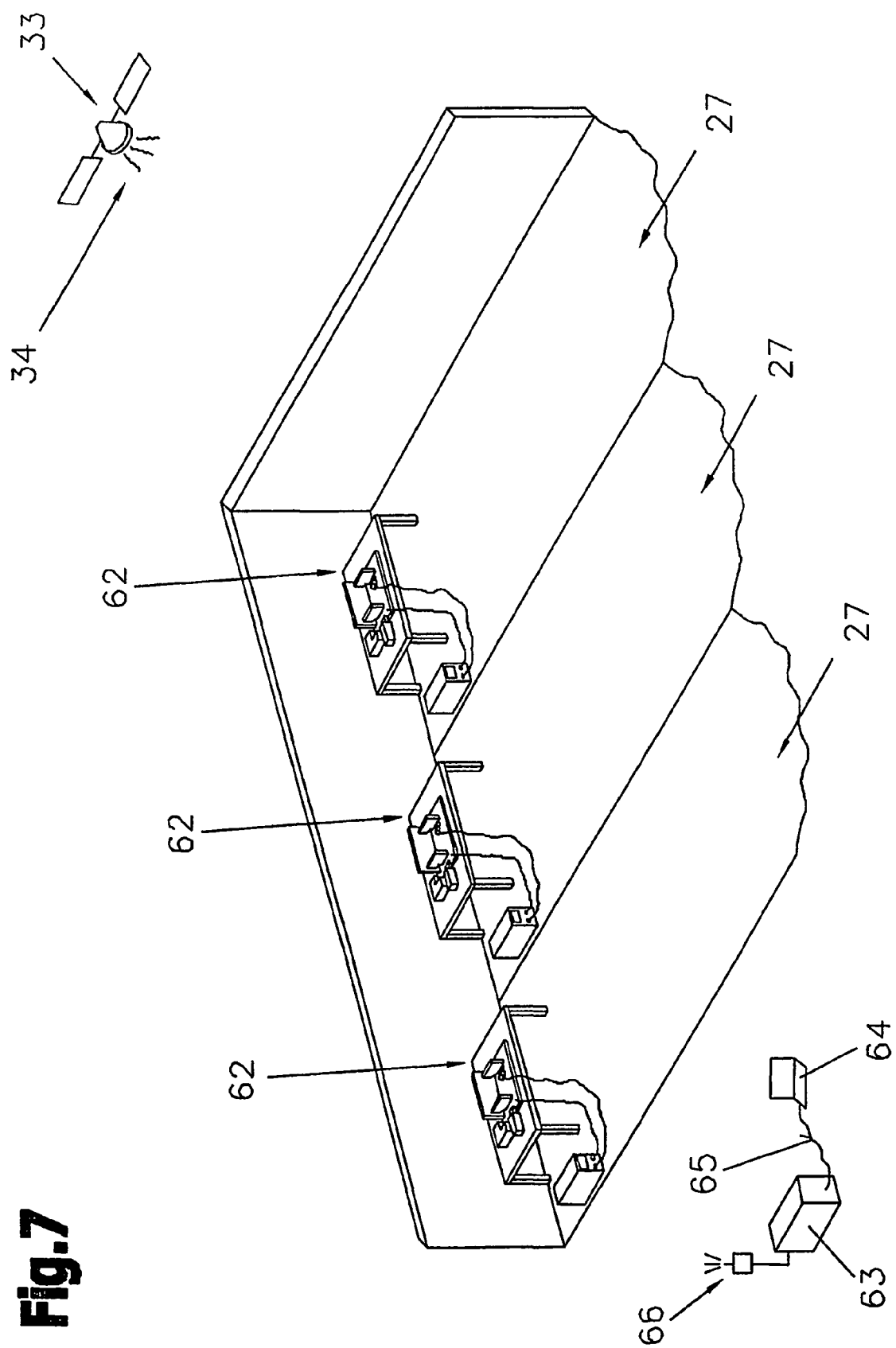
FIG. 7 illustrates the position detection of several welding torches in several welding process areas within one room using an external transmitter.

The transmitter 33 may also be comprised of a satellite as will be described in more detail by way of FIG. 7. In that case, the transmitter 33 supplies one or several welding process areas 27 with the signal 34, wherein the transmitter 33 is located outside the room in a freely movable manner. The supply of the welding process areas 27 may, for instance, be effected by the signal 34 of known GPS satellites. Correspondingly, the sensors 36-38 and 43-45, respectively, of the receiver 35, which are integrated in the welding torch 10, will be replaced with a so-called GPS receiver to transmit the measurement data to the data communication unit 41 and subsequently to the evaluation unit 40, or external evaluation unit 63. From these, the 3D positions of the welding torch 10 and the hence resulting positions for the welds 32 of the workpiece 16 will be acquired and stored as reference values with the respective welding parameters. As already known, the reference values will be used for the production of identical workpieces 16.

The reference values may, moreover, be used for corrective measures during a welding process, as will be described below by way of FIGS. 8 and 9. These depict an exemplary embodiment in which the actual three-dimensional position of the welding torch 10 is compared with the deposited reference values during the welding process.

As already described, the three-dimensional positions are stored as reference values with the respective welding parameters during the position acquisition of the welding torch 10 in a process for welding the welds 32 of the workpiece 16. The reference values may, therefore, also be used for monitoring and correcting purposes. For instance, for the monitoring of the correct posture of the welding torch 10 and the welding speed during a welding process of a workpiece 16 of the same kind, as will be separately described below. Optionally, corrective measures will be initiated on account of the monitoring results in order to ensure an optimum welding quality.

Naturally, the reference values will also be used for the recognition of the position of the welding torch 10 and the start positions 53 of a weld 32.

According to FIG. 8, a default welding speed v is monitored during a welding process, whereby the falling below of the welding speed v is recognized.

As illustrated, the start position 53 and the end position 54 and four other 3D positions 57, 58, 59 and 60 between the start position 53 and the end position 54 are acquired, for instance after a preset time interval 55, during the position detection of the welding torch 10 for a weld 32 connecting the base part 49 with the side part 51 of the workpiece 16 according to FIG. 5. Since, with the definition of the start position 53, timing was started, the time for the positions 57, 58, 59 and 60 as well as the end position 54 were deposited. From the position data, the length s of the weld 32 can be calculated, from which the welding speed v can subsequently be calculated via the known times. The welding speed v will be stored in addition to the reference value of the 3D position of the welding torch 10.

During a welding procedure, the welder should keep the welding speed v preset by the reference values, in order to achieve an optimum-quality weld 32. This is effected by a comparison of the current position, i.e. actual value, of the welding torch 10 with the deposited reference value upon expiration of the time interval 55.

As the evaluation unit 40 recognizes the current position of the welding torch 10 as a reference value for the start position 53 and the welder activates the welding process, the welding parameters are adjusted accordingly and the timing is started. Upon expiration of the time interval 55, an actual-value acquisition takes place, with the current position of the welding torch 10 being determined by the evaluation unit 40 and stored with the associated time value. In doing so, the current values are compared with the reference values and the result is evaluated. A correct welding speed v will be present if the actual value corresponds with the reference value and lies within a predetermined tolerance limit, as is the case with positions 57 and 58.

If the actual-value to reference-value comparison reveals that the actual value has, for instance, fallen below the tolerance limit of the reference value, too low a welding speed v will result during this time interval 55, as is apparent between positions 58 and 67 and the course of the welding speed v over the distance s of the weld 32. In order to enable the required quality of the weld 32 to be approximately maintained, the welding parameters are accordingly adapted by the control device 4 on grounds of the actual-value position of the welding torch 10, for instance by lowering the welding current. Such corrective measures during the welding process will, for instance, prevent a workpiece 16 from melting through.

In order to again reach the desired welding speed v, the welder can be informed, for instance by a warning signal, that he should increase or reduce the welding speed v. This is, for instance, effected in that a warning signal in the higher audible frequency range demands from the welder to accordingly increase the welding speed v. To this end, suitable reference values and welding parameters are calculated by the control device 4 or evaluation unit 40 for the subsequent time interval 55. Correspondingly, the welding speed v is increased until the calculated position 58 is reached, and the increased welding speed v will be lowered again from position 68. To this end, the welder will, for instance, receive a lower-frequency warning signal. The current welding speed v is, thus, gradually adapted to the welding speed v preset by the reference values, until the predefined welding speed v for position 60 will be reached again and the warning signal will become silent. During that time interval 55, i.e. between position 68 and position 60, no comparison of the actual value with the reference value of position 59 takes place, since this actual value has already been prematurely evaluated at position 67.

Since, at position 60, the actual value of the position of the manual welding torch 10 is again in agreement with the reference value, the weld 32, from position 60, can be completed at the predefined welding speed v as far as to the end position 54. It is also possible to store several such reference values in order to enable more precise speed monitoring.

Figure 9:
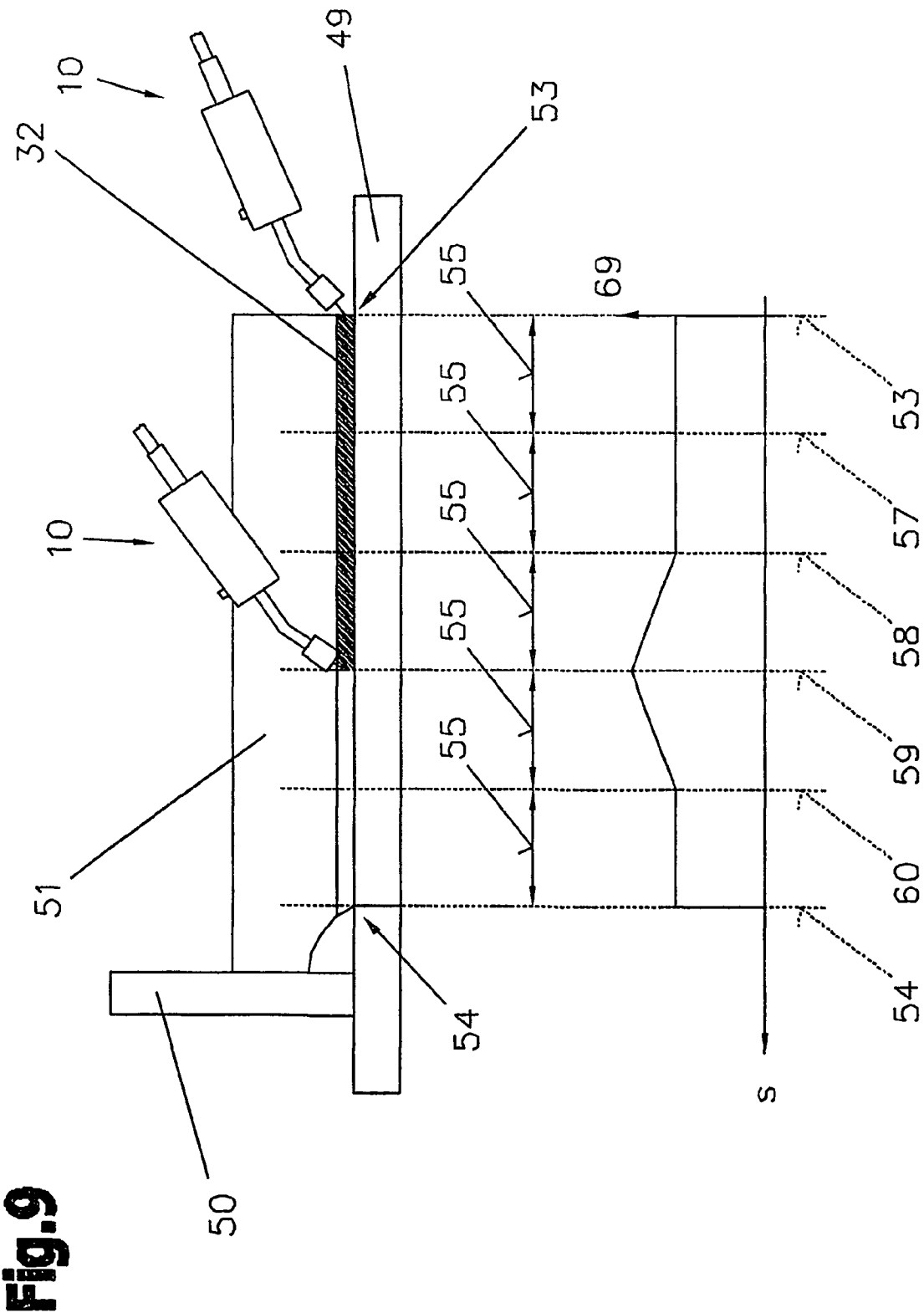
FIG. 9 is a schematic illustration of a welding process while detecting a welding torch work angle that is too steep.

FIG. 9 depicts an exemplary embodiment in which a preset work angle 69, or posture of the welding torch 10, is monitored during the welding process, with any change being recognized.

In accordance with the invention, a welding process is only admitted with a 3D position of the welding torch 10 for a weld 32, that was stored as a reference value for a start position 53 of a weld 32. Likewise, the welding torch 10 described in FIG. 4 is preferably employed, whereby the posture or work angle 69 of the welding torch 10 will be considered in addition to the start position 53. In this configuration of the welding torch 10, two welding torch position values will result from the sensors 36-38 and 43-45, respectively, and, for instance, stored in the evaluation unit 40 as reference values. In doing so, the position of the welding torch 10 calculated from the measurement data of the sensors 43-45 will, for instance, serve as a reference value for the resulting weld 32. The 3D position of the welding torch 10 calculated from the measurement data of the sensors 36-38 will serve as a reference value for the posture of the welding torch 10.

When producing an identical workpiece 16, the posture of the welding torch 10 will, thus, be considered when recognizing a 3D position of the welding torch 10 as a reference value. As a result, the welding parameters will automatically only be adjusted if both of the 3D positions of the welding torch 10 correspond with the associated, deposited reference values, or lie within a predefined tolerance range. A welding process can, thus, only be started at a defined start position 53 with the correct posture of the welding torch 10, as is apparent from the start position 53.

After a predefined time interval 55, the actual value for the work angle 69 of the welding torch 10 is, for instance, determined by the evaluation unit 40 and compared with the associated reference value, in respect to the position 57 of the weld 32. If the actual value of the work angle 69 of the welding torch 10 falls within the tolerance limit of the reference value, the control device 4 will preferably not interfere with the welding process. According to FIG. 9, this is the case at the positions 57 and 58 of the weld 32.

If the welder changes the posture or work angle 69 of the welding torch 10, for instance, within the subsequent time interval 55, i.e. between positions 58 and 59, the actual value of the work angle 68 of the welding torch 10 will be above the tolerance limit of the reference value. Hence results a steeper work angle 69, cf. position 59. This is apparent from the course of the work angle 68 over the distance s of the weld 32. The welding parameters are adapted to the changed posture of the welding torch 10 by the control device 4 so as to keep the quality of the weld 32 approximately constant. The welder can, moreover, be demanded to resume the preset posture of the welding torch 10. This is, for instance, effected in the subsequent time interval 55, i.e. between positions 59 and 60, via suitable warning signals. In this case, the work angle 69 is reduced and, hence, gradually adapted to the work angle 69 preset by the reference values as far as to position 60, with the warning signal becoming silent. The weld 32 can, thus, be finished with the correct work angle 69.

Figure 8:
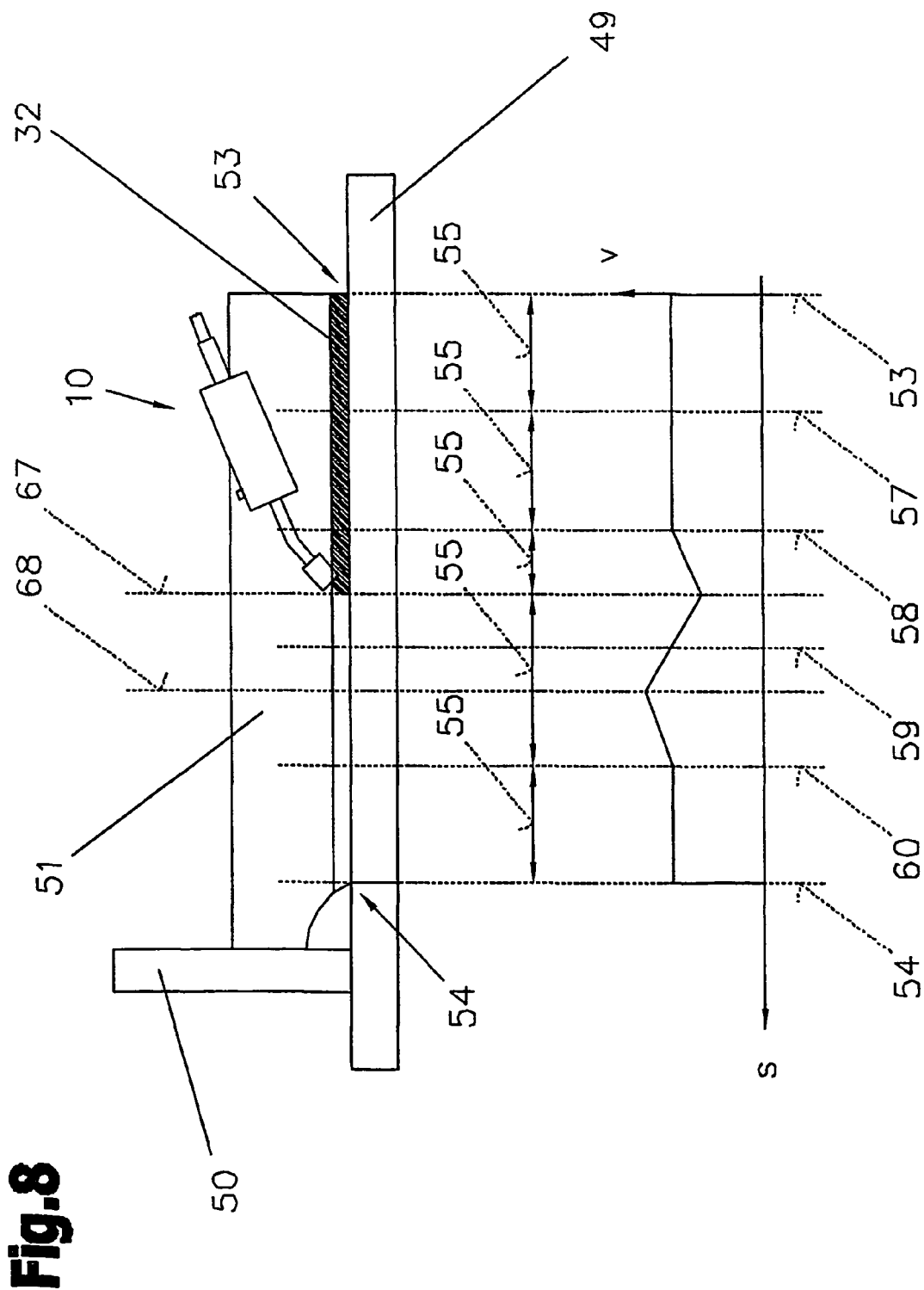
FIG. 8 is a schematic illustration of a welding process while detecting a welding speed that is too slow.

In general, it should be noted in respect to FIGS. 8 and 9 that the recognized corrective measures communicated to the welder as well as the false postures of the welding torch 10 and wrong welding speeds are stored along with the 3D position of the welding torch 10. These corrective measure data as well as the reference values can, for instance, be subsequently read out from the evaluation unit 40, the external evaluation unit 63 or the control device 4, e.g. by a computer 64. They may, for instance, be used for the analysis of a performed welding process. In doing so, the differences between the welded seam 32, i.e. the actual values, and the reference values will become apparent. Automatic documentations of the qualities of the welds 32 will, thus, be performed both for the welding processes and for the individual welding procedures.

It is, of course, also possible to inform the welder on the current welding speed and posture of the welding torch through a constant comparison of the actual value with the reference value, which means a very short time interval 55. This can, for instance, be done via a display integrated in the welding helmet, or via warning signals. To this end, a receiver may be integrated in the welding helmet to receive the data required to take the respective corrective measures.

The display may, for instance, indicate a speed increase by an upward arrow and a speed reduction by a downward arrow, and no arrow may mean that the actual welding speed is correct or within the tolerance range. Instead of arrows, numbers may also be used. In addition to, or instead of, the display, loud-speakers integrated in the welding helmet may, for instance, issue warning signals. As already described in FIG. 8, a high-frequency tone may mean to increase the speed, a low-frequency tone may mean to reduce the speed, and no tone may indicated that the actual welding speed is correct or within the tolerance range. Analogously, the described displays and warning signals may also be used to indicate a work angle 69 that is too steep or too small by accordingly selecting other types of tones.

The welding speed v and/or the work angle 69 may likewise be displayed or graphically represented on a display device provided on the welding torch 10 or on the workbench 28. This may, for instance, be used for training purposes, with necessary corrective measures being communicated or displayed to the welder during a welding process. The practical learning process of the different welding methods can, thus, be accelerated. It goes without saying that this can also be used where the seam 32 to be welded is simulated or virtually welded, i.e. without starting the welding process.

In the previously described exemplary embodiments according to FIGS. 2 to 9, the sensors 35-38 and 43-45 transmitting the measurement data for the determination of the three-dimensional position of the welding torch 10 to the evaluation unit 40, of the receiver 35 are integrated in the welding torch 10.

It is also possible to integrate the sensors 36-38 and 43-45 in the welder's work gear and, in particular, a welding glove, wristwatch or wristband. In this case, it is advantageous that a code for the welder can be deposited besides the reference values. This is, for instance, effected in that the data communication unit 41 integrated in the receiver 35 will simultaneously transmit a defined code to the evaluation unit 40. This will enable the evaluation unit 40 to assign a welder's name or number, which will be deposited accordingly. In such cases, the tolerance limits will, however, have to be raised, since a change of the work gear will not exactly guarantee the same position as before such a change.

Instead of the sensors 36-38 and 43-45, it is also possible to integrate the transmitter 33 in the welding torch 10. In that case, the receiver 35 will assume the previously described tasks of the transmitter 33 and vice versa. The receiver 35 and the sensors will consequently be mounted in the room and connected with the evaluation unit 40 via a radio link or cable connection. The latter will, thus, again be able to determine and store the 3D position of the welding torch 10. This type of position detection device will, of course, depend on the size of the transmitter 33 such that the latter will not influence the dimensions of the welding torch 10.

Basically, the method for detecting the position of a welding torch 10 described in FIGS. 2 to 9, as well as the described system, are not only applicable in manual welding torches, but also in automated welding installations. In the latter case, the focus is, in particular, on quality assurance, i.e. to enable the documentation and storage and subsequent analysis of the quality of the welds 32 of workpieces 16 of the same kind.

The invention claimed is:

1. A manual welding method for determining a position of a welding torch comprising the steps of:
    emitting a signal via a transmitter, wherein the signal is received by at least one sensor arranged in or associated with the welding torch and forms measurement data;
    sending the measurement data to an evaluation unit;
    performing a first real-time welding process via the welding torch;
    determining via the evaluation unit three-dimensional position values for the position of the welding torch in a three-dimensional space during the first welding process performed by the welding torch;
    storing the three-dimensional position values and welding parameters for the first welding process in a memory;
    performing via the welding torch a subsequent real-time welding process of a same kind as the first real-time welding process;
    emitting a subsequent signal via the transmitter, wherein the subsequent signal is received by the at least one sensor forming subsequent measurement data when the welding torch is located at a subsequent position in the three-dimensional space during the subsequent real-time welding process;
    sending the subsequent measurement data to the evaluation unit;
    determining via the evaluation unit subsequent three-dimensional position values for the subsequent position;
    comparing via the evaluation unit the subsequent three-dimensional position values to the three-dimensional position values stored in the memory;
    using both the three-dimensional position values and the welding parameters stored in the memory as reference values for the subsequent welding process; and
    automatically adjusting welding parameters of the subsequent welding process on a basis of the three-dimensional position values stored in the memory.

2. The welding method according to claim 1, further comprising the step of:
    storing the measurement data.

3. The welding method according to claim 1, wherein the three-dimensional position values are determined at any settable times during the first welding process performed with the welding torch.

4. The welding method according to claim 1, further comprising the step of:
    storing times of the first welding process in the memory.

5. The welding method according to claim 1, wherein the welding parameters comprise a welding speed, a sequence of welds and a work angle of the welding torch during the first welding process.

6. The welding method according to claim 1, further comprising the step of:
   reading out the three-dimensional position values for analysis.

7. The welding method according to claim 1, further comprising a step of:
   acoustically or optically indicating to an operator of the welding torch the comparison of the subsequent three-dimensional position values to the three-dimensional position values stored in the memory.

8. The welding method according to claim 1, wherein the three-dimensional position values stored in the memory are of a start position of the welding torch for the first welding process; and further comprising a step of:
   activating the welding torch if the subsequent three-dimensional position values equal the three-dimensional position values stored in the memory.

9. The welding method according to claim 1, wherein the three-dimensional position values stored in the memory are of an end position of the welding torch during the first welding process; and further comprising a step of:
   activating the welding torch if the subsequent three-dimensional position values equal the three-dimensional position values stored in the memory.

10. The welding method according to claim 1, wherein the three-dimensional position values are determined with the welding torch deactivated.

11. The welding method according to claim 1, wherein the signal is received by at least one work gear sensor integrated in work gear of an operator of the welding torch.

12. The welding method according to claim 1, wherein the memory is provided in the welding torch.

13. The welding method according to claim 1, further comprising the step of:
   storing an identifier, of a workpiece to be welded by the first welding process, for identifying additional workpieces of the same kind as the workpiece to be welded by the first welding process.

14. The welding method according to claim 1, further comprising the step of:
   acquiring a time from a beginning point to a second point of the first welding process performed with the welding torch.

15. The welding method according to claim 1, further comprising the step of:
   adjusting a distance between the transmitter and a reference point in the three-dimensional space.

16. The welding method according to claim 1, wherein the welding parameters comprise at least two members selected from the group consisting of a welding current, a welding voltage, and a wire feeding speed welding speed.

17. The welding method according to claim 4, further comprising the step of:
   using the times stored in the memory as reference values for the subsequent welding process of the same kind as the first welding process.

18. The welding method according to claim 4, further comprising the steps of:
   comparing subsequent welding parameters and subsequent times of the subsequent welding process with the welding parameters and the times stored in the memory; and
   if a tolerance limit is exceeded, correcting the subsequent welding parameters and storing the corrections in the memory.

19. The welding method according to claim 4, further comprising the steps of:
   emitting a second signal via the transmitter, wherein the second signal is received by the at least one sensor forming second measurement data when the welding torch is located at a second position in the three-dimensional space;
   sending the second measurement data to the evaluation unit;
   determining via the evaluation unit second three-dimensional position values for the second position;
   ascertaining welding speed from the three-dimensional position values stored in the memory and from the second three-dimensional position values as a function of the times stored in the memory;
   storing the welding speed in the memory;
   emitting a second subsequent signal via the transmitter for the subsequent welding process, wherein the second subsequent signal is received by the at least one sensor forming second subsequent measurement data when the welding torch is located at a second subsequent position in the three-dimensional space;
   sending the second subsequent measurement data to the evaluation unit;
   determining via the evaluation unit second subsequent three-dimensional position values for the second subsequent position;
   measuring a subsequent time of the subsequent welding process from the receiving of the subsequent signal to the receiving of the second subsequent signal;
   ascertaining a subsequent welding speed from the subsequent three-dimensional position values and from the second subsequent three-dimensional position values as a function of the subsequent time;
   comparing the subsequent welding speed with the welding speed stored in the memory; and
   acoustically or optically indicating the comparison of the subsequent welding speed and the stored welding speed to an operator of the welding torch.

20. The welding method according to claim 14, wherein a first position of the welding torch is a position of the welding torch at the beginning of the first welding process; and further comprising the steps of:
   emitting a second signal via the transmitter, wherein the second signal is received by the at least one sensor when the welding torch is at a second position in the three-dimensional space during the first welding process at the second point in time of the first welding process, wherein the second signal forms second measurement data;
   sending the second measurement data to the evaluation unit;
   determining via the evaluation unit second three-dimensional position values for the second position;
   sending the time, the three-dimensional position values, and the second three-dimensional position values to a control device of a welding apparatus performing the first welding process; and
   calculating a welding speed of the first welding process at the control device with the time, the three-dimensional position values, and the second three-dimensional position values.

21. A manual welding system comprising:
a welding apparatus;
a hose pack;
a welding torch connected to the welding apparatus via the hose pack, said welding torch comprising a memory; and
a device for determining a position of the welding torch comprising:
at least one transmitter;
at least one sensor for acquiring measurement data arranged in or associated with the welding torch; and
an evaluation unit connected to the at least one sensor for determining three-dimensional position values of a three-dimensional position of the welding torch via the measurement data acquired by the at least one sensor during a first welding process and during a subsequent welding process performed by the welding torch;
wherein the memory in the welding torch stores the three-dimensional position values and welding parameters for the first welding process; and
wherein the evaluation unit is programmed to automatically adjust welding parameters of a subsequent welding process on a basis of the three-dimensional position values stored in the memory.

22. The welding system according to claim 21, wherein the at least one transmitter is formed by a coil, a radio station, a radar station or a movable transmitter.

23. The welding system according to claim 21, wherein the at least one transmitter comprises at least one coil for generating a magnetic field in an area of a welding process of the welding torch; and
wherein the at least one sensor detects the magnetic field generated by the coil.

24. The welding system according to claim 21, wherein the at least one transmitter covers several welding process areas and several welding torches so as to enable determination of three-dimensional positions of the several welding torches via sensors, respectively, integrated in or associated with a respective welding torch of the several welding torches.

25. The welding system according to claim 21, wherein the at least one sensor is formed by a magnetoresistive sensor.

26. The welding system according to claim 21, further comprising a device for filtering interfering magnetic fields.

27. The welding system according to claim 21, further comprising a display device for at least one of an acoustic display and an optical display of determined three-dimensional positions of the welding torch or of deviations of the welding torch from reference positions.

28. The welding system according to claim 21, further comprising at least one work gear sensor and welder's work gear;
wherein the at least one work gear sensor is provided in the welder's work gear.

29. The welding system according to claim 24, wherein each welding process area of the several welding process areas is assigned a respective reference point in three-dimensional space.

30. The welding system according to claim 27, further comprising welder's work gear;
wherein the display device is integrated in the welder's work gear.

31. A manual welding system comprising:
a welding apparatus;
a hose pack;
a welding torch connected to the welding apparatus via the hose pack, said welding torch comprising a memory; and
a device for determining a position of the welding torch comprising:
at least one transmitter arranged in or associated with the welding torch;
at least one sensor for acquiring measurement data arranged in three-dimensional space surrounding the welding torch; and
an evaluation unit connected to the at least one sensor for determining three-dimensional position values of a three-dimensional position of the welding torch via the measurement data acquired by the at least one sensor during a first welding process and during a subsequent welding process performed by the welding torch;
wherein the memory in the welding torch stores the three-dimensional position values and welding parameters for the first welding process; and
wherein the evaluation unit is programmed to automatically adjust welding parameters of a subsequent welding process on a basis of the three-dimensional position values stored in the memory.

* * * * *